United States Patent [19]
Carey et al.

[11] Patent Number: 5,752,799
[45] Date of Patent: May 19, 1998

[54] APPARATUS FOR LOADING AND CARRYING SMALL RECREATIONAL WATER VEHICLES AND METHOD THEREFOR

[76] Inventors: James E. Carey, 1131 E. Timberidge Dr., Prescott, Ariz. 86303; Jesse Lackey, 25101 Desalle, Laguna Hills, Calif. 92653

[21] Appl. No.: 855,136

[22] Filed: May 13, 1997

Related U.S. Application Data

[63] Continuation of Ser. No. 562,399, Nov. 24, 1995, abandoned.

[51] Int. Cl.$^6$ .................................................. B60P 1/54
[52] U.S. Cl. ...................... 414/543; 414/462; 224/403
[58] Field of Search ........................... 414/462, 471, 414/477, 478, 482, 486, 491, 498, 540, 543, 550; 224/403, 405; 296/3; 405/3; 114/373

[56] References Cited

U.S. PATENT DOCUMENTS

| | | | |
|---|---|---|---|
| 2,794,557 | 6/1957 | Vero | 414/543 X |
| 3,757,972 | 9/1973 | Martin | 414/537 |
| 4,364,326 | 12/1982 | Pike | 114/373 X |
| 4,630,990 | 12/1986 | Whiting | 224/403 X |
| 4,749,317 | 6/1988 | Daniel | 414/482 X |
| 4,784,545 | 11/1988 | Lawrence | 414/482 X |
| 4,881,864 | 11/1989 | Amato | 414/543 |
| 4,960,356 | 10/1990 | Wrenn | 414/462 X |
| 5,205,700 | 4/1993 | Lin et al. | 414/550 X |
| 5,211,526 | 5/1993 | Robinette | 414/543 X |
| 5,249,910 | 10/1993 | Ball | 414/462 X |
| 5,257,728 | 11/1993 | Gibson | 224/403 |
| 5,380,141 | 1/1995 | Flowers | 414/462 |
| 5,393,191 | 2/1995 | Alexander | 414/477 X |
| 5,431,526 | 7/1995 | Peterson et al. | 414/543 |
| 5,445,487 | 8/1995 | Koscinski, Jr. | 414/543 |
| 5,492,454 | 2/1996 | Colyer | 414/462 |
| 5,520,498 | 5/1996 | DiBartolomeo | 414/550 X |
| 5,542,810 | 8/1996 | Florus | 414/462 X |
| 5,603,600 | 2/1997 | Egan et al. | 414/462 |
| 5,620,296 | 4/1997 | McMahon et al. | 414/462 X |
| 5,622,299 | 4/1997 | Berard | 224/403 |

FOREIGN PATENT DOCUMENTS

| 0384386 | 2/1965 | Switzerland | 414/543 |
|---|---|---|---|

*Primary Examiner*—James W. Keenan
*Attorney, Agent, or Firm*—Harry M. Weiss; Jeffrey D. Moy; Harry M. Weiss & Associates, P.C.

[57] ABSTRACT

The present invention is directed to an apparatus and method for loading and storing small recreational water vehicles such as jet skis and wave runners. The apparatus is comprised a lifter apparatus that may be releasably coupled to a carrier vehicle, for lifting and lowering small recreational water vehicles. The apparatus is further comprised of a support rack for supporting a plurality of small water vehicles, which support rack may be coupled to a carrier vehicle and/or to a trailer.

9 Claims, 3 Drawing Sheets

APPARATUS FOR LOADING AND CARRYING SMALL RECREATIONAL WATER VEHICLES AND METHOD THEREFOR

This is a continuation of application Ser. No. 08/562,399 filed on Nov. 24, 1995, now abandoned.

BACKGROUND OF THE INVENTION

1. Field of Invention

This invention relates generally to an apparatus and method for carrying objects and, more specifically, to an apparatus and method for loading and storing small recreational water vehicles such as jet skis and wave runners, where the apparatus is mounted directly onto a vehicle and where the storing apparatus is also mounted onto a vehicle or on a trailer.

2. Background of the Invention

Small recreational water vehicles, most notably jet skis and wave runners, have become extremely popular.(The terms jet ski and wave runner are believed to be trademarked terms. As used herein, they are intended to refer to personal motorized watercraft generically.) These vehicles are built for use by one and sometimes two riders, and may be used in almost any body of water—typically lakes and oceans. On the other hand, because jet skis and wave runners are small when compared to typical recreational boats, jet skis and wave runners are generally not permanently docked at the location where there are to be used. Instead, these vehicles are generally stored by the user, perhaps at the user's home, and transported from the user's home to the water for use.

There are primarily two methods for transporting small water vehicles to the water and, relatedly, for inserting these water vehicles into the water. Most commonly, small water vehicles are transported on a small trailer which may be coupled to a vehicle by means of an automobile hitch. When the user of such a trailer arrives at the location where the jet ski or wave runner is to be used, the user typically backs the trailer down a ramp directly into the water, until the trailer is deep enough so that the jet ski or wave runner may be floated off of the trailer and the rest of the way into the water.

There are several problems with the trailer method of transport and insertion. First, it of course requires the use of a trailer. Trailers, however, are expensive, take up a lot of space, and make the task of driving more difficult. Moreover, to unload a jet ski or wave runner from a trailer, the user typically has to back the trailer down a ramp and into the water—potentially damaging the user's car (particularly if the body of water is salt water) and limiting the effectiveness of the trailer to bodies of water that are accessible by ramps. For bodies of water where there are no ramps, the user must generally—together with several other individuals—physically lift the heavy jet ski or wave runner off of the trailer and then place or drop it into the water.

A second method has recently been developed for transporting jet skis and wave runners and inserting them into the water. This method, of which the Yamahauler is an example, provides for the bolting into the bed of a pickup truck of a rack to support a single jet ski or wave runner in the ordinary position (or perhaps two such vehicles standing on end), the attachment to the truck bed of a winch, and the coupling to the rack of a ramp for sliding the jet ski or wave runner down into the water upon arrival at the user's designation. With this method, the user replaces the jet ski or wave runner into the truck by positioning the rack in or near the water, connecting a cable from the winch to the jet ski or wave runner, and then lifting the jet ski or wave runner onto the rack with the winch.

There are several drawbacks to this method as well. First, it can only accommodate one jet ski or wave runner in the normal position. Second, the device used in this method is relatively complicated, consisting of a winch, a rack, and a ramp. Third, this method works only with a pickup truck, and cannot be used with another vehicle in combination with a trailer.

Therefore, a need existed for an apparatus and method for efficiently transporting jet skis and wave runners and for inserting such vehicles into the water and removing such vehicles from the water. The improved small recreational water vehicle transportation device and method must be able to accommodate at least two jet skis or wave runners in the normal position (i.e., where the jet ski or wave runner rests on its bottom rather than on its end). The improved apparatus and method must comprise means for supporting the plurality of jet skis and wave runners that can be attached to a trailer or releasably attached to a pickup-type truck. The improved apparatus and method must also comprise means for lifting jet skis and wave runners that can be releasably attached to an automobile hitch or that can be coupled to the bed of a pickup truck. The improved apparatus and method must further permit the user to insert the small recreational water vehicle without requiring the user to back his or her vehicle down a ramp and into the water—so as to avoid damage to the user's vehicle and so as to permit the improved apparatus and method to be used with bodies of water that do not have ramp access.

SUMMARY OF THE INVENTION

It is an object of the present invention to provide an improved automobile-mounted apparatus for loading and carrying small recreational water vehicles and method therefor.

It is another object of the present invention to provide an improved recreational water vehicle loading apparatus and method that will permit the transportation in a carrier vehicle of at least two small recreational water vehicles in the bottom-down position.

It is still another object of the present invention to provide an improved recreational water vehicle loading apparatus and method that will permit the loading and carrying of small recreational water vehicles without a trailer.

It is a further object of the present invention to provide an improved recreational water vehicle loading apparatus and method that will permit the loading and unloading of a small recreational water vehicle without the use of a ramp attachment coupled to the carrier-vehicle and without the requirement of backing the carrier-vehicle into the water.

It is yet a further object of the present invention to provide an improved recreational water vehicle loading apparatus and method that will permit the releasable attachment of means for lifting a small recreational water vehicle to at least one of an automobile hitch and coupling means attached to the frame of a pickup-type truck.

BRIEF DESCRIPTION OF THE PREFERRED EMBODIMENTS

In accordance with one embodiment of the present invention, an improved recreational water vehicle loading and carrying apparatus is disclosed. The apparatus is comprised of lifter means releasably attached to an automobile hitch or coupling means on a carrier vehicle, wherein the lifter means are rotatable and adjustable; attachment means for releasably attaching the small recreational water vehicle to the lifter means; and a plurality of spaced-apart elongated support members for supporting on the carrier vehicle at least two small recreational water vehicles in the bottom-down position.

In accordance with another embodiment of the present invention, an improved recreational water vehicle loading and carrying apparatus is disclosed. The apparatus is comprised of lifter means releasably attached to an automobile hitch or coupling means on a carrier vehicle, wherein the lifter means are rotatable and adjustable; attachment means for releasably attaching the small recreational water vehicle to the lifter means; and a plurality of spaced-apart elongated support members for supporting on a trailer one or more small recreational water vehicles in the bottom-down position.

In accordance with still another embodiment of the present invention, an improved method for loading and unloading small recreational water vehicles is disclosed. The method comprises the steps of: providing lifter means releasably attached to an automobile hitch or coupling means on a carrier vehicle, wherein the lifter means are rotatable and adjustable; providing attachment means for releasably attaching the small recreational water vehicle to the lifter means; and providing a plurality of spaced-apart elongated support members for supporting on the carrier vehicle at least two small recreational water vehicles in the bottom-down position.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figure 1:
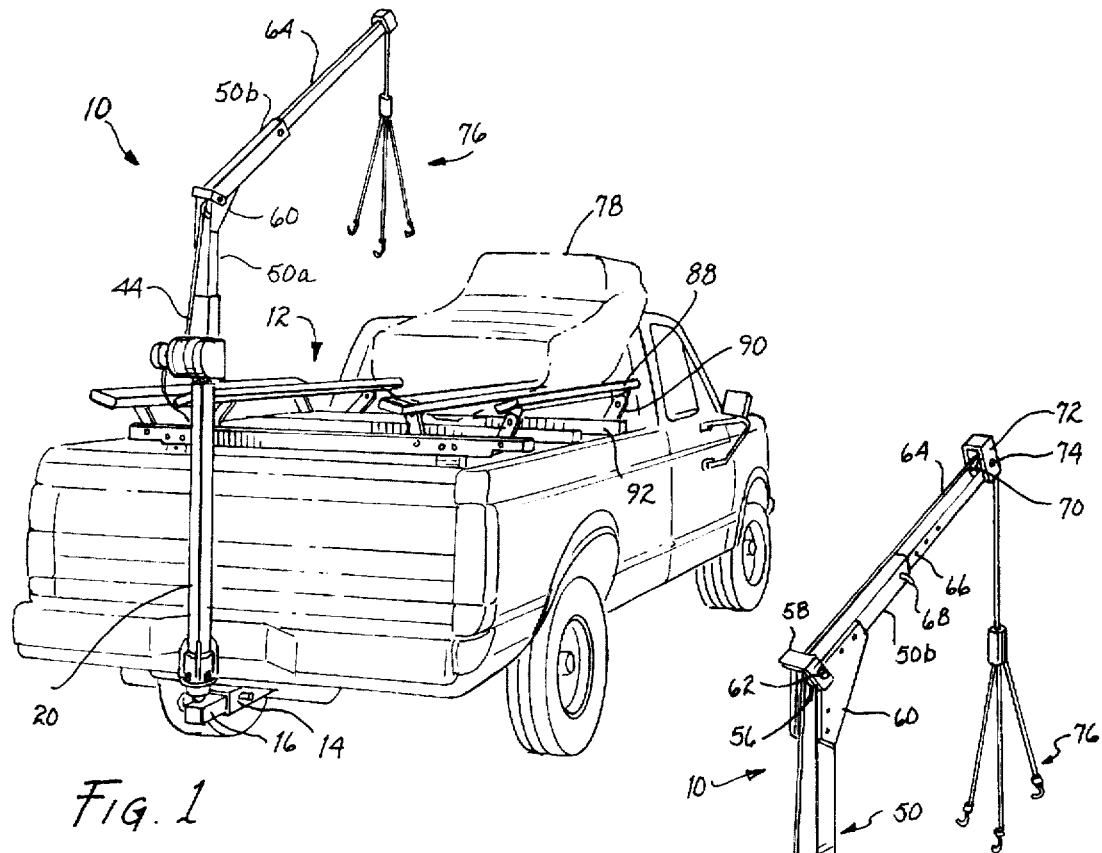
FIG. 1 is a perspective view of the preferred embodiment of the small recreational water vehicle loader of the present invention, shown with one small recreational water vehicle supported on a carrier vehicle.
Figure 2:
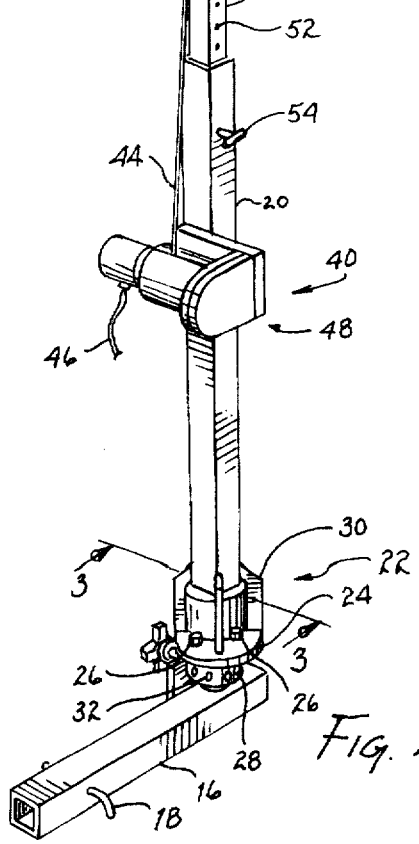
FIG. 2 is a perspective view of the lifting means portion of the small recreational water vehicle loader of the present invention.
Figure 4:
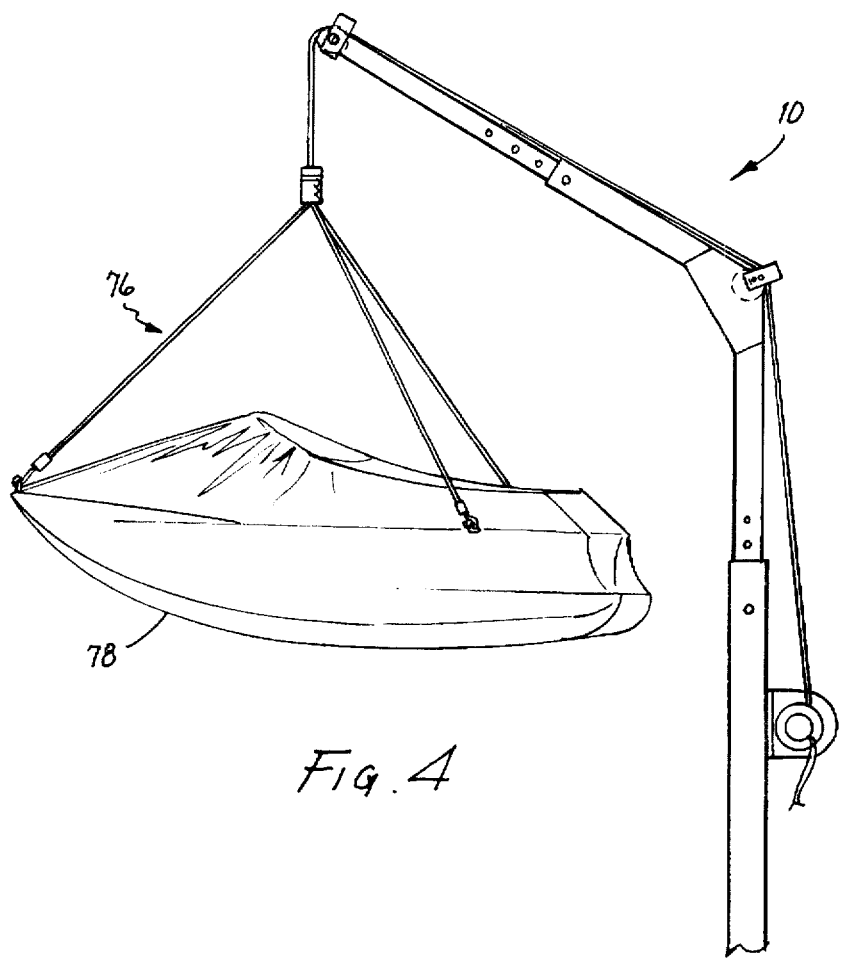
FIG. 4 is a side view of the lifting means portion of the small recreational water vehicle loader of the present invention, shown lifting a small recreational water vehicle.

Referring to the embodiment of FIGS. 1, 2, and 4, reference number 10 refers generally to the lifting apparatus of this invention. Referring to the embodiment of FIGS. 1, 5, and 6–8, reference number 12 refers generally to the support apparatus of the present invention as installed in the rear portion of a carrier vehicle.

Referring now to FIGS. 1 and 2, the lifting apparatus 10 is releasably connected to an automobile hitch 14 by the insertion into the opening portion of the automobile hitch 14 of a tube 16, and the positioning of the tube 16 relative to the hitch 14 so that a pin 18 may be inserted through corresponding holes (not shown) in the tube 16 and the hitch 14. The lifting apparatus 10 further comprises a main support 20, which is substantially perpendicular to the tube 16. Located substantially at the base of the main support 20 is a rotation mechanism 22, a cross-sectional view of which is shown in FIG. 3.

Figure 3:
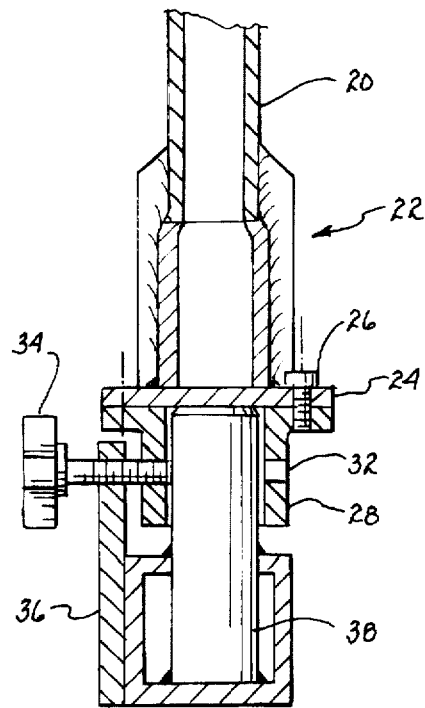
FIG. 3 is a cross-sectional view of the bottom portion of the lifting means of FIG. 2 taken along line 3—3.

Referring specifically to FIGS. 2 and 3, the rotation mechanism 22 comprises a substantially round base plate 24, located substantially at the base of the main support 20 and which is connected with bolts 26 to a hollow locking base 28. Bolts 26 are separated from one another by braces 30. The locking base 28 has a plurality of holes 32, for receiving a bolt 34. The bolt 34 passes through an opening in a plate 36, which plate 36 is attached to a side of the tube 16 and which extends upward until a point that is just below the meeting of the base plate 24 and the locking base 28. The main support 20 has a lower portion 38 that extends through the center of the base plate 24, through the center of the locking base 28, and into the tube 16 through an opening in the top thereof. The lower portion 38 of the main support 20 is preferably round, as are the openings in the base plate 24, the locking base 28, and the tube 16 through which the lower portion 38 passes, and the circumference of the lower portion 38 is less than those of the openings through which the lower portion 38 passes, so that the lower portion 38 may be rotated.

A winch apparatus 40 is positioned on the main support 20. Preferably, an electric powered winch such as a 2500 lb. Ramsey electric winch may be employed, although a manual winch may also be used. The winch apparatus 40 receives a cable 44. The winch apparatus 40 is connected to a power source with cable 46, and the winch apparatus 40 is attached to a mount 48, which mount 48 is attached to the main support 20.

The portion of the main support 20 that is located above the rotation mechanism 22 is preferably a four-sided, hollow tube, so that the main support 20 may receive a second support tube 50, which is also four sided and hollow but which is narrower than the main support 20. The second support tube 50 is angled, with the angle between a lower portion 50a and an upper portion 50b of 90 degrees or greater. The lower portion 50a of the second support tube 50 has a plurality of holes 52, which may be aligned with and receive a bolt 54 that passes through an opening in the main support 20 by raising and lowering the second support tube 50. At substantially the confluence of the lower portion 50a and the upper portion 50b of the second support tube 50—and on the same side of the lifting apparatus 10 as the winch apparatus 40—a first pulley 56 with a grooved rim is positioned. The first pulley 56 is supported by a bracket 58, which bracket 58 is mounted to corresponding plates 60 that are attached on two opposite sides to the upper and lower portions 50a and 50b of the second support tube 50 so as to provide added strength and stability to the lifting apparatus 10. The first pulley 56 is attached to the bracket 58 with axle 62.

The upper portion 50b of the second support tube 50 receives a third support tube 64 which, like the second support tube 50 and the main support 20, is preferably four-sided and hollow, but of smaller dimensions than the second support tube 50 so that the third support tube 64 may be inserted into the upper portion 50b of the second support tube 50. There are a plurality of openings 66 in at least one of the sides of the third support tube 64, which may be aligned with and receive a bolt 68 that passes through an opening in the upper portion 50b of the second support tube 50 by raising and lowering the third support tube 64. Substantially at the distal end of the third support tube 64 there is a second pulley 70 with a grooved rim which is supported by a bracket 72, which bracket 72 is mounted to the third support tube 64. The second pulley 70 is attached to the bracket 72 with axle 74. At the end of the cable 44, there is a coupling arrangement 76—in this embodiment three individual cables with hooks on their respective ends—for coupling a small recreational water vehicle to the lifting apparatus 10. FIG. 4 shows a small recreational water vehicle 78 attached to the lifting apparatus 10 by means of the coupling arrangement 76.

Referring now to FIGS. 9–12, another embodiment of the lifting apparatus 10 is shown. In this embodiment, the lifting apparatus 10 is essentially the same as the lifting apparatus 10 shown in FIGS. 1–4, except that the tube 16 is eliminated and the plate 36 is attached to the locking base 28. Instead of inserting the lower portion 38 of the main support 20 into the tube 16, which tube 16 is then inserted into an automobile hitch 14 as shown in FIG. 1, the lower portion 38 of the main support 20 is inserted into a fixed base 80. The fixed base 80 consists of a plate 82 which is bolted to the frame (not shown) of a pickup-type truck. Attached to the plate 82 is a support tube 84. A gusset, which is attached to the plate 82 and the support tube 84, adds strength and stability to the fixed base 80. The tube 84 enters the rear portion of a pickup-type truck through an opening 86. The lower portion 38 of the main support 20 may then be inserted into the tube 84, in the same manner that the lower portion 38 may be inserted into an opening in tube 16 as shown in FIG. 2. The lifting apparatus may be rotated, in this embodiment, in the same manner described above. There are at least two advantages to this embodiment over the embodiment shown in FIGS. 1–4—this embodiment does not require the use of a hitch, and this embodiment permits operation of the lifting apparatus with the gate of a pickup-type truck in the open position.

Referring now to FIGS. 1 and 6–8, a support apparatus 12 which may be coupled to the rear portion of a carrier vehicle is shown. The support apparatus comprises essentially a four-sided frame, with two sets of two evenly spaced support pads 88 on the top portion of the support apparatus. Each of the two sets of evenly spaced support pads 88 is capable of supporting a small recreational water vehicle 78. The support pads 88 are coupled to angled supports 90, which angled supports 90 are coupled to top end tubes 92 with bolts 94. The top end tubes 92 are substantially perpendicular to the support pads 88. Coupled to the top end tubes 92 at substantially a 90 degree angle thereto are four support posts 96. Parallel to the support pads 88 and attached to the bases of the support posts 96 are two bottom side tubes 98. Perpendicular to the bottom side tubes 98 and also attached to the support posts 96 are two bottom end tubes 100, which tubes 100 are substantially parallel to and below the top end tubes 92. The support apparatus 12 may be placed in the rear area of the carrier vehicle without being coupled thereto or, alternatively, the support apparatus 12 may be bolted to the rear area of the carrier vehicle or may be releasably attached to the rear area of the carrier vehicle using built-in tie downs of the type commonly found in pickup-type trucks. There are several advantages to not permanently attaching the support apparatus 12 to the carrier vehicle—the support apparatus 12 can be removed when not in use, and can be placed in a storage area outside of the carrier vehicle, where it can be used to store water vehicles. It is also possible to attach roller means to the base of the support apparatus to facilitate transportation of the support apparatus into and out of the carrier vehicle and within a storage area.

Figure 5:
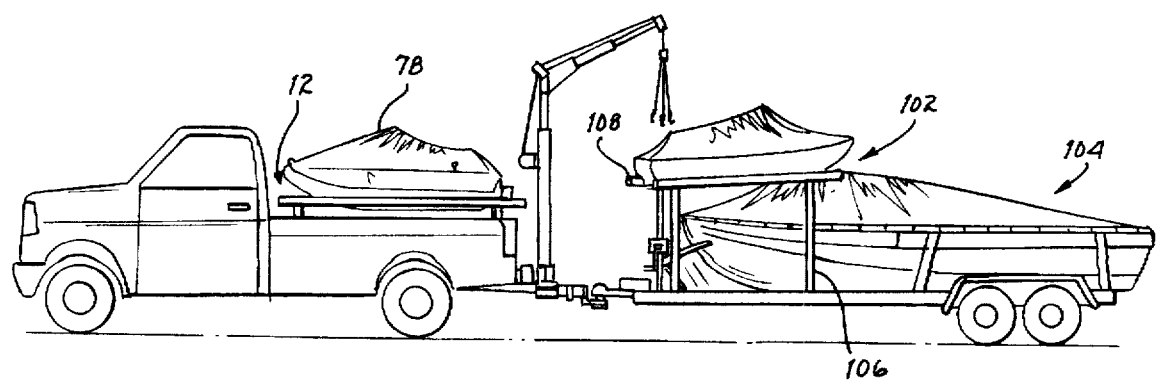
FIG. 5 is a perspective view of the preferred and an alternative embodiment of the small recreational water vehicle loader of the present invention, showing a recreational water vehicle supported on a carrier vehicle and a second recreational water vehicle supported on a trailer.
Figure 6:
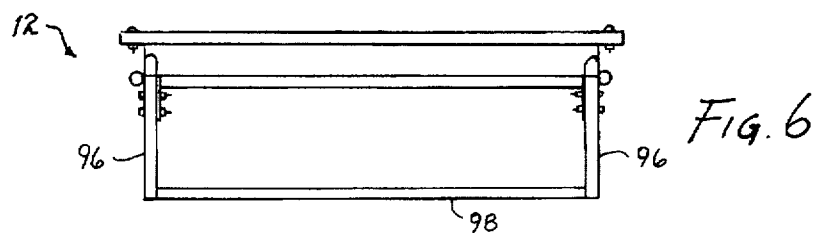
FIG. 6 is a side view of the support means of the small recreational water vehicle loader of the present invention.
Figure 7:
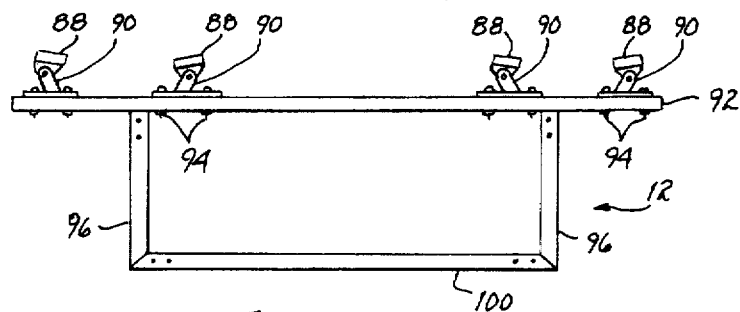
FIG. 7 is an end view of the support means of the small recreational water vehicle loader of the present invention.
Figure 9:
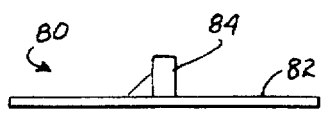
FIG. 9 is a side view of coupling means of the small recreational water vehicle loader of the present invention.
Figure 8:
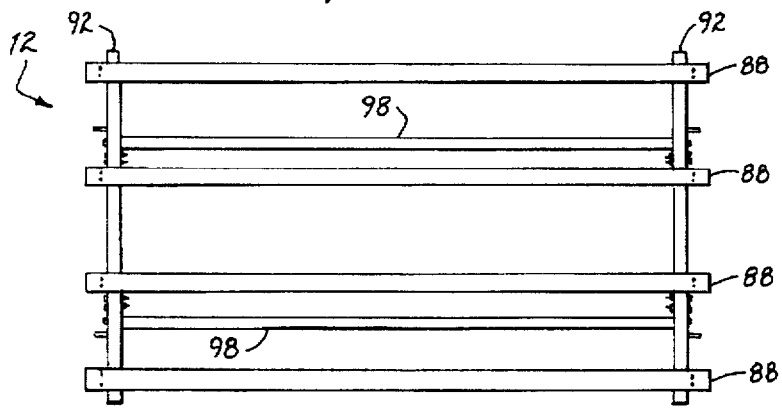
FIG. 8 is a top view of the support means of the small recreational water vehicle loader of the present invention.
Figure 10:
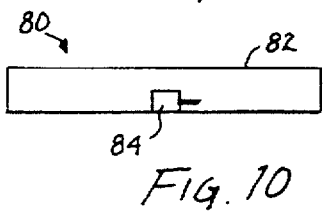
FIG. 10 is a top view of coupling means of the small recreational water vehicle loader of the present invention.
Figure 11:
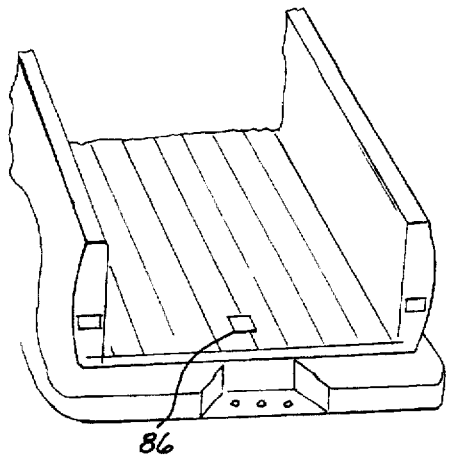
FIG. 11 is a perspective view of the coupling means of FIGS. 9 and 10, after the installation of such coupling means to a pickup-type truck.
Figure 12:
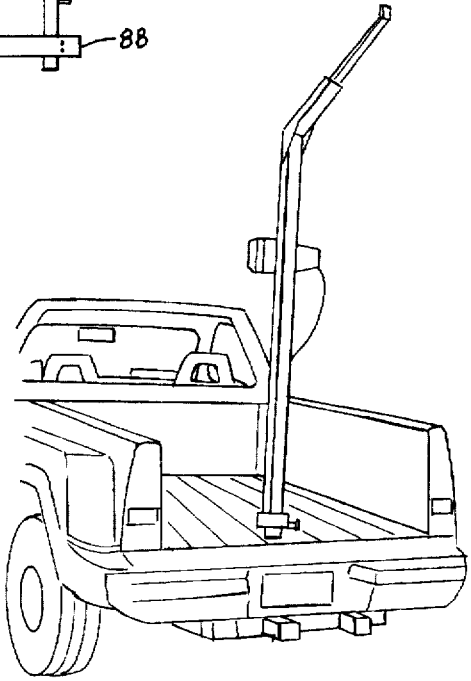
FIG. 12 is a perspective view of the lifter means of the small recreational water vehicle loader of the present invention, as coupled to the coupling means of FIGS. 9–11.

Referring now to FIG. 5, another embodiment of the present invention is shown. In this figure, the lifting apparatus 10 is installed as in FIGS. 1–4, and the support apparatus 12 is attached in the rear of the carrier vehicle as in FIG. 1. In addition, in this figure, a second support apparatus 102 is mounted onto a trailer 104. The second support apparatus 102 comprises posts 106 which are attached to the trailer 104, and support pads 108 which are attached to the posts 106. The second support apparatus may be constructed in the manner described above with respect to the support apparatus 12 so as to support two small water recreational vehicles, or with only one set of support pads so as to accommodate one small water recreational vehicle. Of course, it is possible for a user to use the lifting apparatus 10 with the second support apparatus 102, without also using a first support apparatus 12.

Operation of the Invention

The lifting apparatus 10 of the current invention may be used to lift a water vehicle from a support apparatus 12 in a carrier vehicle, from a support apparatus 102 on a trailer, from a body of water, from a dock, or from a beach—or to lower a water vehicle to any one of these destinations.

To lift a water vehicle, the user will first attach the coupling arrangement 76 to the water vehicle. If necessary, the user may need to release additional length of the cable 44 by operating the winch apparatus 40 so that the coupling arrangement 76 can reach the small water vehicle. There are a number of possible ways of constructing the coupling arrangement 76 and of coupling the cable 44 to a water vehicle—FIGS. 2 and 4 show one such method, that of providing three cables with hooks fastened at the end, for attachment to eye bolts on the body of the water vehicle. It would also be possible to couple the lifting apparatus to the water vehicle with more or less than three cables, to attach the cables to holes in the surface of the water vehicle, to attach the cables to a support cradle—perhaps made of netting or fabric—that would envelop the water vehicle during lifting and lowering, or to use other coupling methods. Once the water vehicle is attached to the lifting apparatus, it may be lifted by the user by operating the winch apparatus 40.

Once the water vehicle is suspended from the lifting apparatus, it may be lowered from that apparatus into the water, onto a support apparatus, or to another appropriate surface. If, for example, the water vehicle has been lifted from a body of water behind the carrier vehicle, and is to be lowered into a support apparatus 12 in the rear of the carrier vehicle, the user will need to rotate the lifting apparatus. The user may do so by extracting the bolt 34 and rotating the lifting apparatus into the desired position, and then reinserting the bolt 34 into the nearest hole 32. Once the lifting apparatus is in position, the user may lower the water vehicle by operating the winch apparatus in the opposite direction of that necessary to raise the water vehicle. The water vehicle is sufficiently light that, when suspended from the lifting apparatus, it may be maneuvered by the user onto the proper support pads or other desired location as it is being lowered from the lifting apparatus.

While the invention has been particularly shown and described with reference to preferred embodiments thereof, it will be understood by those skilled in the art that the foregoing and other changes in form and details may be made therein without departing from the spirit and scope of the invention.

We claim:

1. A combination of at least one personal motorized watercraft and an apparatus for loading and unloading personal motorized watercraft comprising, in combination:

at least one personal motorized watercraft;

a truck-type carrier vehicle adapted to carry said at least one personal motorized watercraft;

support rack means coupled to a bed portion of said truck-type carrier vehicle for supporting said at least one personal motorized watercraft in a bottom-down front-forward position and above said bed portion during transportation of said at least one personal motorized watercraft; and lifter means releasably connected to a hitch attached to a rear portion of said truck-type carrier vehicle for lifting in a vertical direction only said at least one personal motorized watercraft when said at least one personal motorized watercraft is in a non-moving mode and lowering said at least one personal motorized watercraft onto said support rack means in a bottom down front forward position, said lifter means having means for grasping spaced-apart portions of said personal motorized watercraft to permit lifting thereof.

2. A combination of at least one personal motorized watercraft and an apparatus for loading and unloading personal motorized watercraft in accordance with claim 1 wherein said lifter means further comprises rotation means for rotating the lifter means during the lifting and lowering of said at least one personal motorized watercraft.

3. A combination of at least one personal motorized watercraft and an apparatus for loading and unloading personal motorized watercraft in accordance with claim 1 wherein said lifter means further comprises height adjustment means for adjusting the height of said lifter means to accommodate a plurality of different sizes and types of personal motorized watercraft.

4. A combination of at least one personal motorized watercraft and an apparatus for loading and unloading personal motorized watercraft in accordance with claim 1 wherein said support rack means comprises a plurality of spaced-apart elongated support members for supporting said at least one personal motorized watercraft.

5. A method for loading and unloading personal motorized watercraft comprising the steps of:

providing at least one personal motorized watercraft;

providing a truck-type carrier vehicle adapted to carry said at least one personal motorized watercraft;

providing support rack means coupled to a bed portion of said truck-type carrier vehicle for supporting said at least one personal motorized watercraft in a bottom-down front-forward position and above said bed portion during transportation of said at least one personal motorized watercraft; and providing lifter means releasably connected to a hitch attached to a rear portion of said truck-type carrier vehicle for lifting in a vertical direction only said at least one personal motorized watercraft when said at least one personal motorized watercraft is in a non-moving mode and lowering said at least one personal motorized watercraft onto said support rack means in a bottom down front forward position, said lifter means having means for grasping spaced-apart portions of said personal motorized watercraft to permit lifting thereof.

6. The method of claim 5 wherein the step of providing lifter means further comprises the step of providing rotation means for rotating the lifter means during the lifting and lowering of said at least one personal motorized watercraft.

7. The method of claim 5 wherein the step of providing lifter means further comprises the step of providing height adjustment means for adjusting the height of said lifter means to accommodate a plurality of different sizes and types of personal motorized watercraft.

8. The method of claim 5 wherein the step of providing support means further comprises the step of providing a plurality of spaced-apart elongated support members for supporting said at least one personal motorized watercraft.

9. A combination of two personal motorized watercraft and an apparatus for loading and unloading personal motorized watercraft comprising, in combination:

two personal motorized watercraft;

a truck-type carrier vehicle adapted to carry said two personal motorized watercraft;

support rack means coupled to a bed portion of said truck-type carrier vehicle for supporting said two personal motorized watercraft in a bottom-down front forward position and above said bed portion during transportation of said two personal motorized watercraft; and lifter means releasably connected to a hitch attached to a rear portion of said truck-type carrier vehicle for lifting in a vertical direction only each one of said two personal motorized watercraft when said two personal motorized watercraft are in a non-moving mode and lowering each one of said two personal motorized watercraft onto said support rack means in a bottom down front forward position, said lifter means having means for grasping spaced-apart portions of each one of said two personal motorized watercraft to permit lifting thereof.

* * * * *